(12) United States Patent
Wietschorke

(10) Patent No.: US 8,425,034 B2
(45) Date of Patent: Apr. 23, 2013

(54) LENS ELEMENT WITH IMPROVED PRISMATIC POWER

(75) Inventor: Helmut Wietschorke, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 125 days.

(21) Appl. No.: 13/022,245

(22) Filed: Feb. 7, 2011

(65) Prior Publication Data

US 2011/0194070 A1    Aug. 11, 2011

Related U.S. Application Data

(60) Provisional application No. 61/302,330, filed on Feb. 8, 2010.

(30) Foreign Application Priority Data

Feb. 8, 2010 (DE) .......................... 10 2010 007 267

(51) Int. Cl.
    *G02C 7/06* (2006.01)
(52) U.S. Cl.
    USPC ................................. 351/159.42; 351/159.45
(58) Field of Classification Search ............. 351/159.41, 351/159.42, 159.45
    See application file for complete search history.

(56) References Cited

U.S. PATENT DOCUMENTS

| | | |
|---|---|---|
| 6,364,481 B1 | 4/2002 | O'Connor et al. |
| 6,382,790 B1 | 5/2002 | Girod |
| 7,008,058 B2 | 3/2006 | Haimerl et al. |
| 7,216,977 B2 | 5/2007 | Poulain et al. |
| 2010/0296052 A1 | 11/2010 | Esser et al. |
| 2010/0309428 A1 | 12/2010 | Altheimer et al. |

FOREIGN PATENT DOCUMENTS

| | | |
|---|---|---|
| DE | 698 13 803 T2 | 12/2003 |
| EP | 1 107 849 B1 | 7/2003 |
| EP | 1 895 351 A1 | 3/2008 |
| EP | 1 412 806 B1 | 10/2008 |
| FR | 2 814 819 A1 | 4/2002 |
| WO | 03/079095 A2 | 3/2006 |
| WO | WO2006/084121 A1 | 8/2006 |
| WO | 2008/089996 A1 | 1/2008 |
| WO | WO2008/000397 A1 | 1/2008 |

*Primary Examiner* — Darryl J Collins
(74) *Attorney, Agent, or Firm* — Harness, Dickey & Pierce, P.L.C.

(57) ABSTRACT

A lens element for progressive spectacles. The lens element has at least one near viewing zone and a distance viewing zone which have different focusing powers. Further, the lens element has a predetermined prismatic power. Furthermore, a vertical component of the predetermined prismatic power is realized at a first point of the lens element, and a horizontal component of the predetermined prismatic power is realized at a second point of the lens element. The present invention also relates to a method for producing a lens element.

15 Claims, 6 Drawing Sheets

LENS ELEMENT WITH IMPROVED PRISMATIC POWER

CROSS-REFERENCE TO RELATED APPLICATIONS

This application claims the priority of German patent application No. 10 2010 007 267.2, filed Feb. 8, 2010, and U.S. provisional application No. 61/302,330, filed Feb. 8, 2010. The entire contents of these priority applications are incorporated herein by reference.

BACKGROUND OF THE INVENTION

The present invention relates to a lens element for progressive spectacles, having at least one near viewing zone and a distance viewing zone which have different focusing powers, the lens element having a predetermined prismatic power.

Furthermore, the present invention relates to a method for producing a lens element having at least one near viewing zone and a distance viewing zone which have different focusing powers, and a predetermined prismatic power.

Spectacle lenses for correcting visual deficiencies are generally known. In particular, it is also known to produce lens elements for spectacles which have a multifocal optical power. These serve the purpose, in particular, of correcting the age-related visual deficiency, that is to say a reduction, caused by age-related phenomena, in the accommodative power of the eye.

In ophthalmic fabrication, a spectacle lens which attains prescribed dioptric powers at beam paths running through prescribed measuring and reference points at said points is produced starting from a dioptric prescription which is determined, for example, by an ophthalmologist. The position of the measuring and reference points depends on the type of lens, for example whether a single-vision or multifocal lens is involved, and is determined by the manufacturer.

With reference to the terminology used below and the definition of its respective meaning, reference is made to Standard DIN EN ISO 13 666, in which the vocabulary of ophthalmology is standardized. Here, DIN stands for "Deutsche Institut für Normung e.V." [German Standards Institute], EN for "Europäische Norm" [European Standard] and ISO for "Internationale Organisation für Normung" [International Standards Organization]. Where they are not explicitly otherwise defined below, the meanings defined in the standard hold. In particular, the definitions of the following terms are found there: near viewing and distance viewing design point as well as near viewing and distance viewing reference point or near design reference point and distance design reference point (Chapters 5.13 and 5.14), progressive surface (7.7), progressive (spectacle) lens or progressive-power lens, progressive-addition lens (8.3.5), distance portion and distance viewing zone (14.1.1), near portion and near viewing zone (14.1.3), progression channel or intermediate corridor (14.2.11), addition (14.2.1), thickness reduction prism or prism thinning (14.2.11) and prism reference point (14.2.12).

Progressive spectacles are distinguished, in particular, in that each lens element has at least two zones with different focusing actions, which are designed for viewing at different object distances. By contrast with conventional multifocal lens elements, in which an abrupt transition occurs between the different zones, progressive lens elements are distinguished by the fact that the focusing action changes continuously between the zones. Progressive spectacles are therefore "smooth", that is to say the functions of the surfaces of the front and back sides of the lens elements are twice continuously differentiable. In general, a lens element for progressive spectacles includes a zone situated in an upper part of the lens for viewing at relatively large object distances, a so-called "distance viewing zone", and a zone therebeneath for seeing at relatively small object distances, a so-called "near viewing zone". The terms "above" and "below" relate in this case to the orientation of the lens element when it is worn by a user. Between the near viewing zone and the distance viewing zone lies a transition zone of continuous change in power, the so-called "progression zone".

Here, the manufacturer determines respectively both for the distance and for the near viewing zone a measuring point at which the dioptric power of the respective zone can be controlled, the so-called "distance design point" and "near design point", respectively. He also determines yet a further point at which the prismatic power of the lens element is to be realized and can be controlled, the so-called "prism reference point".

The prismatic power at the prism reference point is determined from the prescribed prismatic power and a thickness reduction prism. The thickness reduction prism is a prismatic power with a vertical base direction, that is to say the thickness reduction prism leads only to a beam deflection in a vertical direction without a horizontal deflection, in order to reduce the thickness of the lens element of the progressive spectacles, and not to change the horizontal component of the prismatic power. The thickness reduction prism must be the same in both lens elements of a pair of spectacles. The total prismatic power resulting from the prescribed prismatic power and the thickness reduction prism can then be designed either for a beam path used by an actual spectacle wearer, or for a beam path in a measuring instrument.

The dioptric power at a point on the spectacle lens is composed of the focusing action and the prismatic power. The focusing action consists of the spherical (sph) and the astigmatic powers, the astigmatic power including the cylinder strength (or the astigmatic difference cyl) and the axis direction (A). The prismatic power consists of the prismatic deviation (Pr) and the base setting (B). Consideration of the focusing and prismatic powers over the points of an entire zone of the lens element indicates a close relationship between the two powers. This relationship is described in simplified form by the Prentice formula, for example. Thus, a focusing action, constant in a relatively large zone, of a lens element of a spectacle lens leads to a specific continuous change in the prismatic power in this zone. Consequently, in the case of standard lens elements for progressive spectacles which have a spherotoroidal prescription surface and a progressive surface which remains unchanged for a specific range of prescribed powers, the prismatic power is permanently prescribed only at one point of the lens element, since (given a prescribed progressive surface) the required spherotoroidal prescription surface can in general not be used to attain prismatic powers prescribed at more than one point in the lens element. However, even with individually optimized lens elements a permanent prismatic prescription at more than one point generally leads to large additional spherical or astigmatic aberrations.

The prism reference point, that is to say the point at which the prismatic power is permanently prescribed, is preferably situated at a location which is used chiefly for seeing. Thus, if one's look is removed from this prism reference point, the difference between the actual prismatic power and the prismatic power at the prism reference point is enlarged with increasing distance. The reason for this is the focusing action of the lens element of the spectacle lens.

Consequently, in the case of anisometropia, that is to say given different dioptric prescriptions for the two eyes of a spectacle wearer, the prismatic powers at mutually corresponding points of the left and right lens elements of a pair of spectacles are generally not the same. Thus, if the prism reference point is in the distance viewing zone, given anisometropia similar prismatic powers for corresponding points in the distance viewing zone certainly result in the immediate surroundings of the prism reference point but, in return, larger prismatic differences result in the near viewing zone. These prismatic differences in the near viewing zone are then enlarged in a fashion approximately proportional to the spherical difference in power between the prescriptions for the right and left eyes. The situation is similar for a position of the prism reference point in the near viewing zone.

It is known that the prismatic power can be split in vector terms into a horizontal component and a vertical component. This is known, for example, from the specialist article entitled "Astigmatische and prismatische Einstärken-Brillengläser" ["Astigmatic and prismatic single-vision spectacle lenses"], Alfred Schikorra, reprint from the special periodical "Der Augenoptiker", Willy Schrickel publishing house, Leinfelden, 1987. It is therefore known that given a position of the prism reference point in the progression zone, or else at the transition from the distance viewing zone to the progression zone, the horizontal component of the prismatic power in the distance viewing zone does not generally correspond to the horizontal component of the prescribed prismatic power. This difference results chiefly from the tilted position of use of the lens element in front of the eye of a spectacle wearer, or from an astigmatic prescription. It is particularly pronounced for lenses having an astigmatic prescription and an oblique axis position. However, this then forces the spectacle wearer to make an unnatural movement of convergence or divergence of his pair of eyes when looking through the distance viewing zone, and this not only causes an unpleasant feeling during wearing, but can also possibly cause consequential damage over a lengthy period.

For progressive lenses with an astigmatic prescription of $\leq 1$ dioptres, the document U.S. Pat. No. 7,216,977 B2 proposes a continuous increase in the horizontal prismatic power along a main line of sight such that the difference between the horizontal prismatic power at the distance and near reference points is at least 2 dioptres. However, this additional requirement placed on the progressive lens results in large additional spherical or astigmatic errors for the spectacle wearer, since this mode of procedure presupposes many additional horizontal prismatic requirements along the main line of sight. Moreover, the document referred to does not give any details as to how the vertical component of the prismatic power is to be realized.

Document FR 2 814 819 A1 proposes a progressive lens having a horizontal prism which supports a convergence of the eyes and is present either only in the near viewing zone, over the entire progressive lens, or in a fashion rising from the distance viewing zone to the near viewing zone along the main line of sight. There is no examination of the effects of this horizontal prismatic requirement on the other aberrations, on the prismatic powers for the spectacle wearer in the distance viewing zone of the progressive lens, nor on the realization of a possibly prescribed prism.

Document EP 1 412 806 B1 proposes to add a vertical prism to a lens in order to improve the image quality of the lens. However, there is no examination of changes in the horizontal component of a prismatic power.

Document EP 1 107 849 B1 proposes introducing an additional prism in a near viewing zone in order to guide the optical center as close as possible to the center of the near viewing zone, that is to say the object in this document is to improve the near viewing zone by means of a vertical prism. However, there is no examination of changes in the horizontal component of a prismatic power.

Document DE 698 13 803 T2 describes the use of a horizontal prism to correct a peripheral zone of a lens element with a high degree of bending. This can also include a surface correction in the viewing zone in order to minimize optical errors. However, in this case there is no examination of the relationship between a plurality of prismatic requirements placed on an individual lens element and the losses, typically resulting therefrom, in the imaging quality. Nor is there an examination of the specific requirements for progressive lenses.

It is therefore an object of the present invention to provide an improved lens element for progressive spectacles.

BRIEF SUMMARY OF THE INVENTION

In accordance with a first aspect of the invention, it is therefore proposed to develop the lens element named at the beginning to the effect that a vertical component of the predetermined or prescribed prismatic power is realized at a first point of the lens element, and a horizontal component of the predetermined prismatic power is realized at a second point of the lens element.

It follows that in the case of the inventive lens element for progressive spectacles the prismatic prescription is decomposed into a horizontal component and a vertical component, and that the two requirements are realized at different sites or locations of the lens element. This means that the reference point at which the horizontal component is realized differs from that point where the vertical component is realized. Here, "realized" is to be understood in the sense that the prismatic power at the respective reference point corresponds to that of the prescription (plus any possible thickness reduction prism) and can be controlled at this point. The reference points of the vertical component and of the horizontal component are therefore different. However, in the course of this description "prism reference point" is understood, as heretofore, to be the prism reference point used in accordance with the customary teaching, that is to say that reference point which is used when both the horizontal and the vertical components are realized at the same point together with a thickness reduction prism.

Dividing the prismatic requirements at two different locations in the lens element is possible without any appreciable losses as regards the astigmatic and the spherical aberrations, since one prismatic requirement leads to a tilting of the associated surface elements of the front and back surfaces relative to one another. The required tilting direction of the surface elements depends in this case directly on the base setting of the prismatic requirement. However, since the tilting directions of the surfaces for the horizontal component and the vertical component of the prismatic requirements are perpendicular to one another, they can be realized independently of one another without resulting in any appreciable losses with reference to the spherical and astigmatic aberrations.

In accordance with a second aspect of the invention, it is also proposed to develop the method named at the beginning to the effect that a vertical component of the predetermined prismatic power is realized at a first point of the lens element, and a horizontal component of the predetermined prismatic power is realized at a second point of the lens element.

In accordance with a third aspect of the invention, a lens element for progressive spectacles is proposed which is produced using a method according to the second aspect of the invention.

In accordance with a fourth aspect of the invention, a lens element in accordance with the first aspect of the invention is proposed for use in progressive spectacles in order to reduce a non-prescribed prismatic power of the progressive spectacles for a spectacle wearer.

In accordance with a fifth aspect of the invention, it is proposed to use a lens element in accordance with a first aspect of the invention for the purpose of producing progressive spectacles in order to reduce a non-prescribed prismatic power for a spectacle wearer.

The method in accordance with the second aspect of the invention, the lens element in accordance with the third aspect of the invention, the lens element in accordance with the fourth aspect of the invention, and the use in accordance with the fifth aspect of the invention have the same advantages as the lens element in accordance with the first aspect of the invention.

The object set at the beginning is therefore completely achieved.

In a refinement of the lens element in accordance with the first aspect of the invention, it can be provided that the second point is a point in the distance viewing zone.

Moreover, in a further refinement, in this case a thickness reduction prism is realized at the first point.

Correspondingly, it is also possible in the case of the method in accordance with the second aspect of the invention that the second point is a point in the distance viewing zone. A thickness reduction prism can also be realized there at the first point.

The natural horizontal eye position for seeing in the distance viewing zone is achieved with this division of the prismatic requirement. However, it is possible thereby for the requirement of the horizontal component of the prismatic requirement no longer to be fulfilled at the prism reference point. This is, however, only of lesser significance, since the lens is generally designed for looking at an object at an intermediate distance in the progression zone, in which the prism reference point is situated. In any case, this intermediate distance requires an additional convergence movement of the eyes, irrespective of whether the requirement based on the horizontal component of the prismatic requirement is realized in the distance or progression zone. Consequently, a change in the convergence movements owing to the realization of the horizontal component of the prismatic requirement in the distance viewing zone can be accepted. The same holds for the near viewing zone.

This procedure can be useful furthermore so as to achieve that, given an anisometropia in a central distance viewing zone, the difference in the power of the horizontal component of the prismatic requirement is similar at corresponding sites in a right-hand and a left-hand lens element. Moreover, given anisometropia, the difference in the power of the vertical component of the prismatic requirement remains the same at corresponding sites of a right-hand and a left-hand lens element of a pair of spectacles, since the reference point of the vertical component is situated, as heretofore, at the prism reference point. This means that the prismatic differences between the right-hand and the left-hand lens elements for distance and near viewing zones can be balanced with reference to the requirement of the vertical component of the prismatic requirement.

Only the horizontal prismatic difference in power can vary, owing to the proposed arrangement, by means of the horizontal component of the prismatic requirement between corresponding points in the progression zone and the near viewing zone. However, this is acceptable because, as has already been set forth above, a convergence movement of the eyes is necessary when looking through the progression zone and through the near viewing zone. The deviations in the progression zone and in the near viewing zone that have been accepted by the selection of the reference point of the horizontal component of the prismatic power therefore do not worsen the comfort felt in wearing the spectacles. The deviations are in a zone in which the eyes accomplish a convergence movement in any case, and so only one other convergence movement is carried out than would have been the case given a conventional selection of the reference point of the horizontal component. Occasionally, this mode of procedure can even produce in the near viewing zone an additional prismatic power supporting the convergence movement of the eye.

As has already been set forth above, the second point, that is to say the reference point of the horizontal component, can be a point in the distance viewing zone. However, the second point can also correspond to the intersection point of the beams through the lens element along the zero line of sight. Correspondingly, it can also be provided that the second point corresponds to the intersection point of the beams through the lens element along the zero line of sight, and at the same time the first point corresponds at the prism reference point at which the thickness reduction prism is also realized.

Both for the lens element in accordance with the first aspect of the invention, and for the method in accordance with the second aspect of the invention, it can be provided that neither the first point nor the second point is in the near viewing zone.

Moreover, both for the lens element in accordance with the first aspect of the invention, and for the method in accordance with the second aspect of the invention, it can be provided that the distance viewing zone and the near viewing zone merge continuously into one another in a progression zone, the first point being at a location of the progression zone at which at least 20% of an addition of the lens element is achieved.

In accordance with the usual understanding of the person skilled in the art, "addition" is to be understood here as the increment in the mean spherical power from the distance viewing zone to the near viewing zone. The mean spherical power at a point in the lens element denotes the sum of the spherical power in the first principle meridian and half the astigmatic difference (sph+0.5*cyl). The increment in this mean spherical power is therefore 0% of the addition in the distance viewing zone and 100% of the addition in the near viewing zone, and rises continuously in the progression zone.

Finally, it can be provided that both for the lens element in accordance with the first aspect of the invention, and for the method in accordance with the second aspect of the invention the lens element has a cylindrical power (cyl) of greater than 0.5 dioptres given an axis direction (A) for which it holds that: 10°<A<80° or 100°<A<170°, in particular 20°<A<70° or 110°<A<160°, in particular 30°<A<60° or 120°<A<150°, in particular 40°<A<50° or 130°<A<140°.

The realization of the prismatic requirements can be performed, for example, by a suitable tilting of the surfaces of the lens element. However, the prismatic requirements changed in accordance with the invention can also be taken into account directly when optimizing the progressive surface for individually optimized progressive spectacles and/or lens elements.

It is to be understood that the features mentioned above and those still to be explained below can be used not only in the respectively specified combination, but also on their own or in other combinations, without departing from the scope of the present invention.

BRIEF DESCRIPTION OF THE SEVERAL VIEWS OF THE DRAWING

Exemplary embodiments of the invention are explained below with reference to the attached drawing, in which.

DETAILED DESCRIPTION OF THE INVENTION

Figure 1:
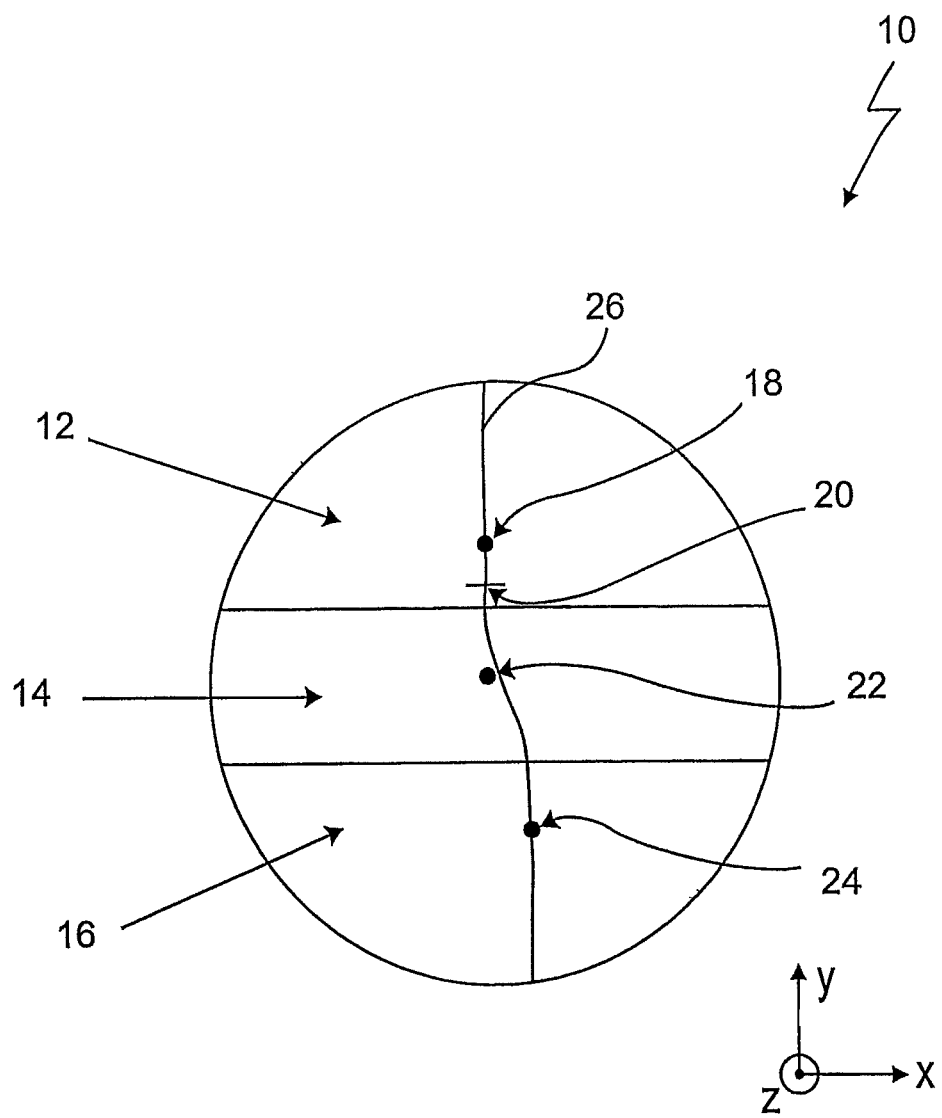
FIG. 1 shows a diagrammatic view of an embodiment of a lens element.

FIG. 1 shows a lens element 10 in accordance with an embodiment. The lens element 10 is provided for the purpose of use in progressive spectacles. The lens element 10 is illustrated purely diagrammatically in FIG. 1, for example a circular shape of the lens element 10 has been illustrated, but of course the lens element 10 can also have any other shape.

Various viewing zones of the lens element 10 are illustrated in FIG. 1. In the upper part of the lens element 10 there is located a distance viewing zone 12 which is provided for viewing objects far removed. The distance viewing zone 12 merges via a progression zone 14 into a near viewing zone 16 which is located in a lower part of the lens element 10. The near viewing zone 16 is provided for the purpose of viewing objects nearby. As a rule, the distance viewing zone 12 serves the purpose of realizing a prescribed focusing action for seeing at a distance. The near viewing zone 16 serves the purpose of realizing a prescribed focusing action for seeing close up. An increment in power rises continuously from the distance viewing zone 12, in which there is no increment in power, up to the near viewing zone 16. Thus, 0% of the addition is present at the transition from the distance viewing zone 12 to the progression zone 14, and 100% of the addition is then present at the transition from the progression zone 14 to the near viewing zone 16.

Situated in the distance viewing zone is a distance design point 18 at which the correction for the distance viewing zone 12 is realized.

Situated below the distance design point 18 is an adjusting point 20. A prism reference point 22 is located below the adjusting point 20, in the progression zone 14. A near design point 24 is, moreover, located within the near viewing zone 16. The illustration in FIG. 1 relates, of course, only to the concrete exemplary embodiment. Another distribution of the points is also possible in principle.

The near design point 24 constitutes the point for which the correction power is realized in the near viewing zone. The near design point 24 in the near viewing zone 16 therefore corresponds in terms of its function to the distance design point 18 in the distance viewing zone 12.

A thickness reduction prism for reducing the thickness of the lens element 10 is realized at the prism reference point 22.

A prescribed prismatic power of the lens element 10 is decomposed into a horizontal component and a vertical component. The vertical component and the horizontal component of the prescribed prismatic power are, however, realized respectively at different points in the lens element 10. Thus, the vertical component of the prismatic power is realized at the prism reference point 22, although it is possible in principle for it to be realized at any desired first point. The horizontal component of the prescribed prismatic power is realized at the adjusting point 20 in the embodiment illustrated in FIG. 1. However, the horizontal component can be realized at any desired second point, in particular at a point in the distance viewing zone 12.

Figure 2:
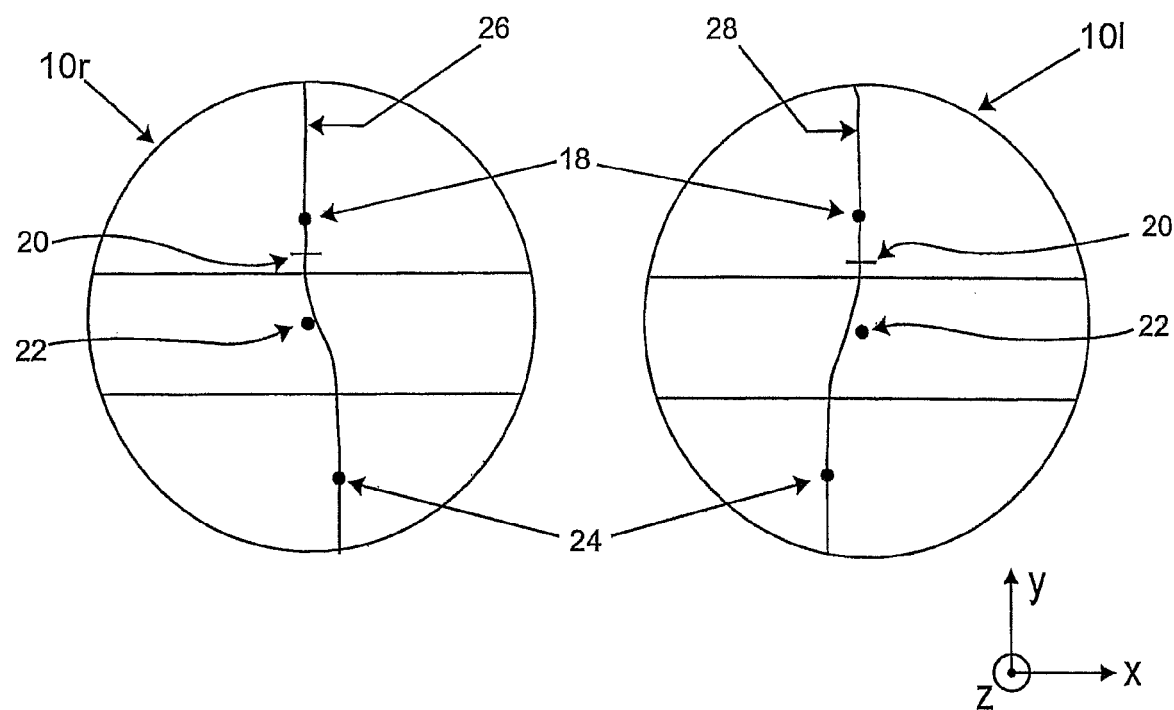
FIG. 2 shows a diagrammatic view of two lens elements in accordance with the embodiment in FIG. 1 as provided for spectacles.

FIG. 2 shows two lens elements 10r, 10l in accordance with the embodiment illustrated in FIG. 1, as they are used in progressive spectacles. The lens element 10r is intended in this case for the right eye, while the lens element 10l is intended for the left eye. The view in FIG. 2 therefore looks from the front onto the lens elements in their position of use, or onto a spectacle wearer. The positions of the distance design point 18, the prism reference point 22, the near design point 24 and the adjusting point 20 correspond to the embodiment illustrated in FIG. 1. Also drawn in are a principal line of sight 26 of the lens element 10l for the left eye, and a principal line of sight 28 for the lens element 10r of the right eye. The position of the principal line of sight depends, inter alia, on the distance of the lens element from an eye of the spectacle wearer. As a rule, however, it runs very close to a so-called principal progression meridian which follows the profile of the minima of the astigmatic aberration of the lens element 10 in a central region of the progression zone 14, the minima resulting from the position of the minimum of the astigmatic aberration along a horizontal line (that is to say in the X-direction).

The principal line of sight is defined by the beam intersection points through a lens front surface when the spectacle wearer looks onto objects which lie directly in front of him at object distances as defined. A standardized object distance model is specified, for example, in DIN (Deutsches Institut für Normung e.V. [German Standards Institute]) 58208, Part 2. The specified object distances can, however, deviate from this model. As is to be seen, the principal lines of sight 26, 28 run towards one another from the distance viewing zone 12 to the near viewing zone 16. The near design points 24 are therefore spaced apart from one another less than are the distance design points 18.

It may be seen therefrom that the eyes of a spectacle wearer accomplish a converging movement in any case when they view an object through the near viewing zone 16. Consequently, it is possible to accept the deviation, resulting in the near viewing zone 16, of the horizontal component from the prescribed prismatic power, which is caused by the realization of the horizontal component in the distance viewing zone. The same holds for the progression zone 14, in which the principal lines of sight 26, 28 move towards one another.

Figure 3:
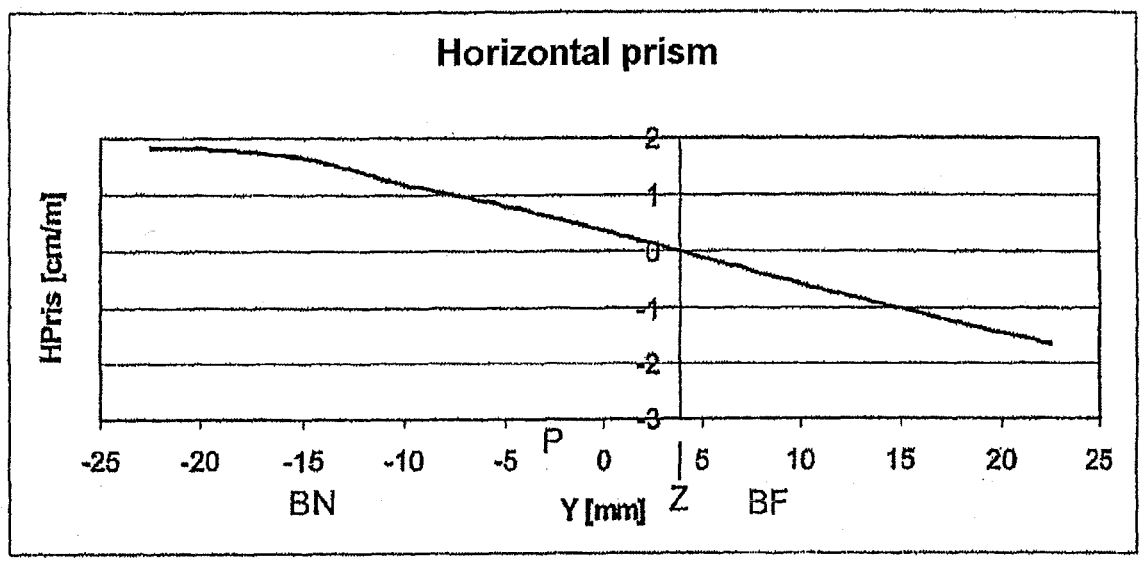
FIG. 3 shows the profile of a horizontal prism along the principal line of sight of a lens element in accordance with the embodiment in FIG. 1.

FIG. 3 shows the distribution of the horizontal prism along the principal line of sight of the lens element in accordance with the embodiment in FIG. 1. The profile was produced for a progressive lens with a distance power sph −1.0 dpt cyl 2.0 dpt A 135° and the addition 2.0 with a front progressive surface, by way of example. Here, a "progressive surface" is understood to be a non-rotationally symmetrical surface with a continuous change in curvature over the entire area or a part thereof, compare DIN ISO (Internationale Organisation für Normung [International Standards Organization]) 13666.

The following Y-coordinates apply in this example for the respective points: distance design point (BF)=7, adjusting point (Z)=4, prism reference point (P)=−2, and near design point (BN)=−14. Owing to the tilting of the back surface in accordance with the embodiment of the invention, the horizontal component of the prismatic prescription is 0 at the adjusting point. The adjusting point A can, for example, be the zero line of sight in the distance viewing zone 12, so that no prismatic power of the horizontal component occurs here, and there is an appropriately improved feeling of wearing comfort.

Figure 4:
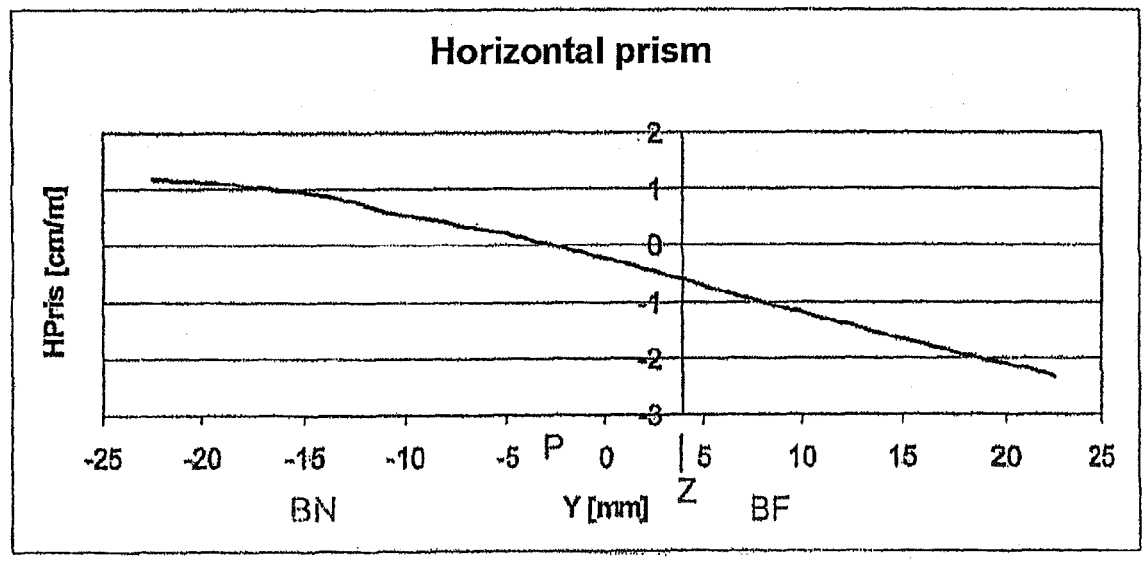
FIG. 4 shows the profile of a horizontal prism along the principal line of sight of a conventional lens element.

For comparison, FIG. 4 shows the profile of the horizontal prism along the principal line of sight for a conventional progressive lens with a toroidal back surface. The same Y-coordinates apply to the reference points. However, the prismatic power is realized uniformly at the prism reference point 22. The horizontal prismatic power is therefore 0 at the prism reference point 22 (P). It is −0.6 cm/m at the adjusting point 20 (Z). There is thus usually a horizontal prismatic power present in the distance viewing zone, thus giving rise to the corresponding instances of worsening of the viewing comfort. However, this disadvantage can be removed by means of a lens element in accordance with the embodiment of the invention. Here, the astigmatic and spherical aberrations are virtually identical for the spectacle wearer of the lens elements 10 in FIGS. 3 and 4.

The following data apply to the lens elements 10 illustrated in FIGS. 3 and 4:

The orientation of the coordinate system for the front surface is determined as follows: the positive X-axis points in a horizontal nasal direction, and the Y-axis in a vertical direction. The coordinate origin (0,0) of the coordinate system is the geometrical center of the lens element 10.

Dioptric power sph −1.0 dpt cyl 2.0 dpt axis 135° prism 0 cm/m base 0°; addition 2.00 dpt; refractive index=1.60; thickness reduction prism 1.25 cm/m base 270°.

The front surface of the lens element is a progressive surface, and the back surface is a toroidal surface with the radii 159.5 mm and 104.0 mm.

Center thickness 2.0 mm.

The following coordinates (X; Y) (in mm) result with reference to this previously defined X, Y-coordinate system:

Distance design point (18): (0; 7)
Adjusting point (20): (0; 4)
Prism reference point (22): (0; −2)
Near design point (24): (2.0; −14).

Additionally, the following are the basic conditions of use: pantoscopic angle=9°, frame wrap angle=5°, distance between center of rotation and lens vertex=25.5 mm, pupil distance=64 mm, object distance far=infinite, object distance near=380 mm, frame with horizontal (boxed) lens size=60.5 mm and vertical (boxed) lens size=32 mm, horizontal distance of the adjusting point from the nasal rim of the frame: 23 mm, and vertical distance from the lower rim: 20 mm.

The following data apply to the profile of the principal lines of sight 26, 28 in FIG. 3:

| X | Y | Object distance (mm) |
|---|---|---|
| 0.5 | 20.00 | 1000000.0 |
| 0.4 | 18.00 | 1000000.0 |
| 0.4 | 16.00 | 1000000.0 |
| 0.3 | 14.00 | 1000000.0 |
| 0.2 | 12.00 | 1000000.0 |
| 0.2 | 10.00 | 1000000.0 |
| 0.1 | 8.00 | 1000000.0 |
| 0.0 | 6.00 | 1000000.0 |
| 0.0 | 4.00 | 1000000.0 |
| 0.1 | 2.00 | 5844.1 |
| 0.3 | 0.00 | 1929.4 |
| 0.5 | −2.00 | 1144.8 |
| 0.8 | −4.00 | 807.4 |
| 1.0 | −6.00 | 619.0 |
| 1.3 | −8.00 | 498.4 |
| 1.6 | −10.00 | 414.1 |
| 1.7 | −12.00 | 380.0 |
| 1.7 | −14.00 | 380.0 |
| 1.6 | −16.00 | 380.0 |
| 1.6 | −18.00 | 380.0 |
| 1.5 | −20.00 | 380.0 |

The following data apply to the profile of the principal lines of sight 26, 28 in FIG. 4:

| X | Y | Object distance (mm) |
|---|---|---|
| 0.7 | 20.00 | 1000000.0 |
| 0.6 | 18.00 | 1000000.0 |
| 0.6 | 16.00 | 1000000.0 |
| 0.5 | 14.00 | 1000000.0 |
| 0.4 | 12.00 | 1000000.0 |
| 0.3 | 10.00 | 1000000.0 |
| 0.3 | 8.00 | 1000000.0 |
| 0.2 | 6.00 | 1000000.0 |
| 0.1 | 4.00 | 1000000.0 |
| 0.2 | 2.00 | 5850.3 |
| 0.4 | 0.00 | 1930.3 |
| 0.7 | −2.00 | 1145.2 |
| 0.9 | −4.00 | 807.6 |
| 1.2 | −6.00 | 619.2 |
| 1.4 | −8.00 | 498.5 |
| 1.7 | −10.00 | 414.3 |
| 1.9 | −12.00 | 380.0 |
| 1.8 | −14.00 | 380.0 |
| 1.8 | −16.00 | 380.0 |
| 1.8 | −18.00 | 380.0 |
| 1.7 | −20.00 | 380.0 |

The following table shows the sagittas of the progressive surfaces of the lens elements in FIGS. 3 and 4:

| | X | | | | | | | | |
|---|---|---|---|---|---|---|---|---|---|
| Y | −21.0 | −18.0 | −15.0 | −12.0 | −9.0 | −6.0 | −3.0 | 0.0 | 3.0 |
| 21.0: | ******* | ******* | ******* | ******* | −1.966 | −1.848 | −1.804 | −1.833 | −1.935 |
| 18.0: | ******* | ******* | ******* | −1.670 | −1.481 | −1.366 | −1.324 | −1.355 | −1.459 |
| 15.0: | ******* | ******* | −1.517 | −1.258 | −1.072 | −0.960 | −0.920 | −0.953 | −1.059 |
| 12.0: | ******* | −1.508 | −1.178 | −0.922 | −0.739 | −0.629 | −0.591 | −0.626 | −0.733 |
| 9.0: | −1.645 | −1.243 | −0.916 | −0.662 | −0.481 | −0.372 | −0.336 | −0.372 | −0.480 |

-continued

|  |  |  |  |  |  |  |  |  |
|---|---|---|---|---|---|---|---|---|
| 6.0: | −1.460 | −1.058 | −0.731 | −0.477 | −0.297 | −0.189 | −0.154 | −0.190 | −0.298 |
| 3.0: | −1.358 | −0.955 | −0.626 | −0.371 | −0.188 | −0.079 | −0.043 | −0.080 | −0.188 |
| 0.0: | −1.346 | −0.940 | −0.608 | −0.348 | −0.161 | −0.047 | −0.007 | −0.041 | −0.151 |
| −3.0: | −1.425 | −1.016 | −0.680 | −0.415 | −0.220 | −0.095 | −0.048 | −0.078 | −0.189 |
| −6.0: | −1.596 | −1.183 | −0.842 | −0.569 | −0.365 | −0.230 | −0.171 | −0.194 | −0.307 |
| −9.0: | −1.862 | −1.443 | −1.094 | −0.812 | −0.596 | −0.449 | −0.379 | −0.397 | −0.510 |
| −12.0: | ******* | −1.795 | −1.436 | −1.144 | −0.916 | −0.756 | −0.678 | −0.692 | −0.805 |
| −15.0: | ******* | ******* | −1.871 | −1.567 | −1.326 | −1.156 | −1.072 | −1.085 | −1.199 |
| −18.0: | ******* | ******* | ******* | −2.081 | −1.830 | −1.651 | −1.564 | −1.578 | −1.694 |
| −21.0: | ******* | ******* | ******* | ******* | −2.427 | −2.245 | −2.157 | −2.173 | −2.291 |

|  | X |  |  |  |  |  |
|---|---|---|---|---|---|---|
| Y | 6.0 | 9.0 | 12.0 | 15.0 | 18.0 | 21.0 |
| 21.0: | −2.111 | −2.360 | ******* | ******* | ******* | ****** |
| 18.0: | −1.637 | −1.888 | −2.213 | ******* | ******* | ****** |
| 15.0: | −1.238 | −1.490 | −1.817 | −2.219 | ******* | ****** |
| 12.0: | −0.912 | −1.166 | −1.494 | −1.898 | −2.380 | ****** |
| 9.0: | −0.660 | −0.914 | −1.243 | −1.650 | −2.135 | −2.701 |
| 6.0: | −0.479 | −0.735 | −1.067 | −1.477 | −1.967 | −2.538 |
| 3.0: | −0.371 | −0.631 | −0.968 | −1.384 | −1.881 | −2.459 |
| 0.0: | −0.339 | −0.605 | −0.951 | −1.376 | −1.880 | −2.465 |
| −3.0: | −0.384 | −0.660 | −1.017 | −1.452 | −1.967 | −2.560 |
| −6.0: | −0.509 | −0.798 | −1.167 | −1.615 | −2.141 | −2.745 |
| −9.0: | −0.719 | −1.020 | −1.403 | −1.865 | −2.404 | −3.021 |
| −12.0: | −1.019 | −1.330 | −1.727 | −2.204 | −2.758 | ****** |
| −15.0: | −1.416 | −1.732 | −2.141 | −2.635 | ******* | ****** |
| −18.0: | −1.912 | −2.233 | −2.652 | ******* | ******* | ****** |
| −21.0: | −2.512 | −2.837 | ******* | ******* | ****** | ****** |

The table of the sagittas shows the distances from a reference plane for the grid points of an equidistant grid. The table shows the distances of the progressive surface from a reference plane whose origin in the X-, Y-direction is the geometrical center of the progressive lens. For the person skilled in the art, the position of the reference plane in space for the example lenses in FIGS. 3 and 4 results from the specified values for the forward tilt and the frame lens angle of the lens elements. The Z-direction points into the light in this case, that is to say a negative sagitta value describes a surface point closer to the eye, or a positive sagitta value describes a surface point further removed from the eye.

Figure 5:
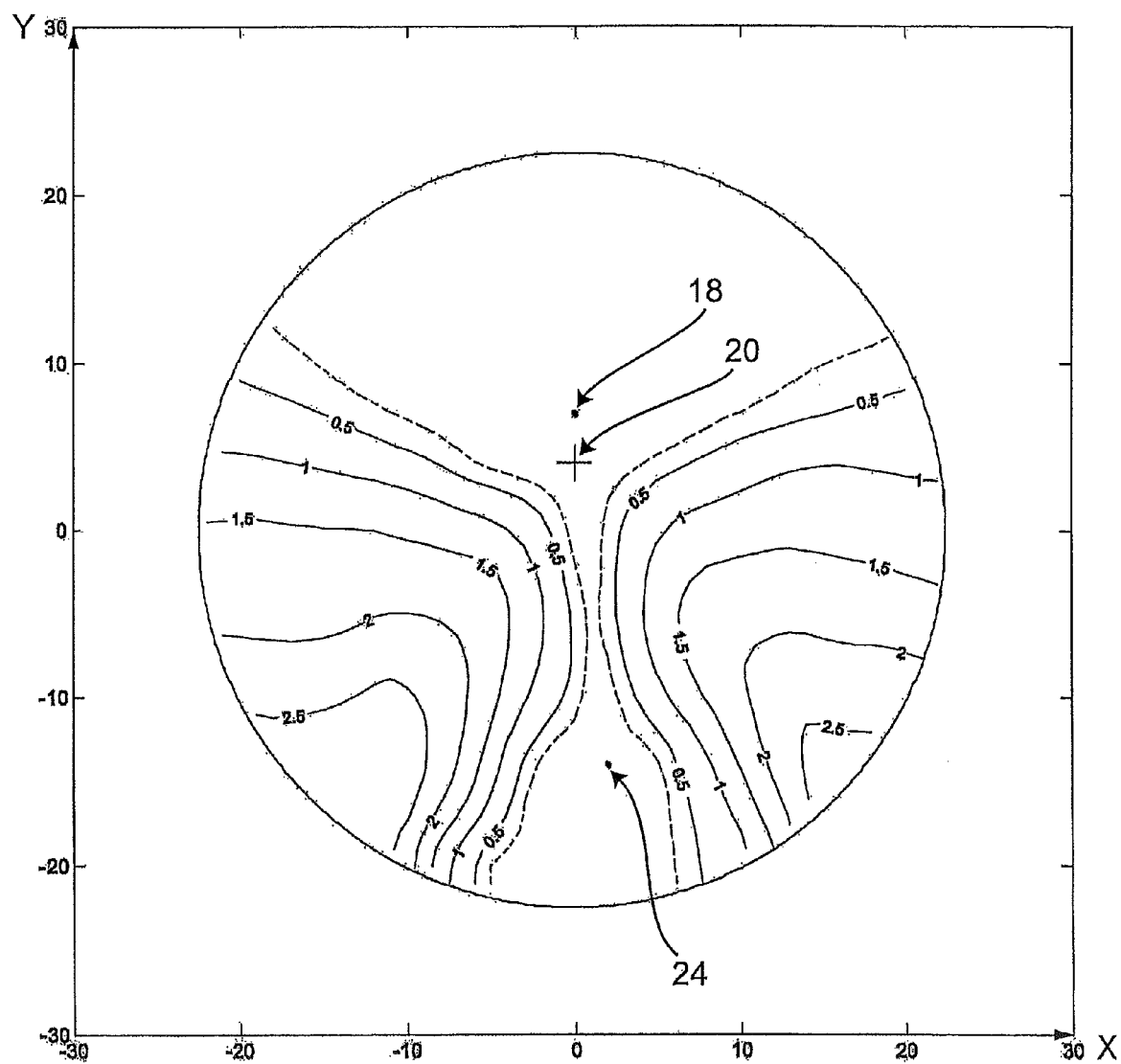
FIG. 5 shows the distribution of astigmatic aberrations over the entire lens element in FIG. 3.

FIG. 5 shows a distribution of the astigmatic aberration, or of the absolute astigmatic differences of the astigmatic power components of the focusing actions of the lens element 10, which is also shown in FIG. 3.

Figure 6:
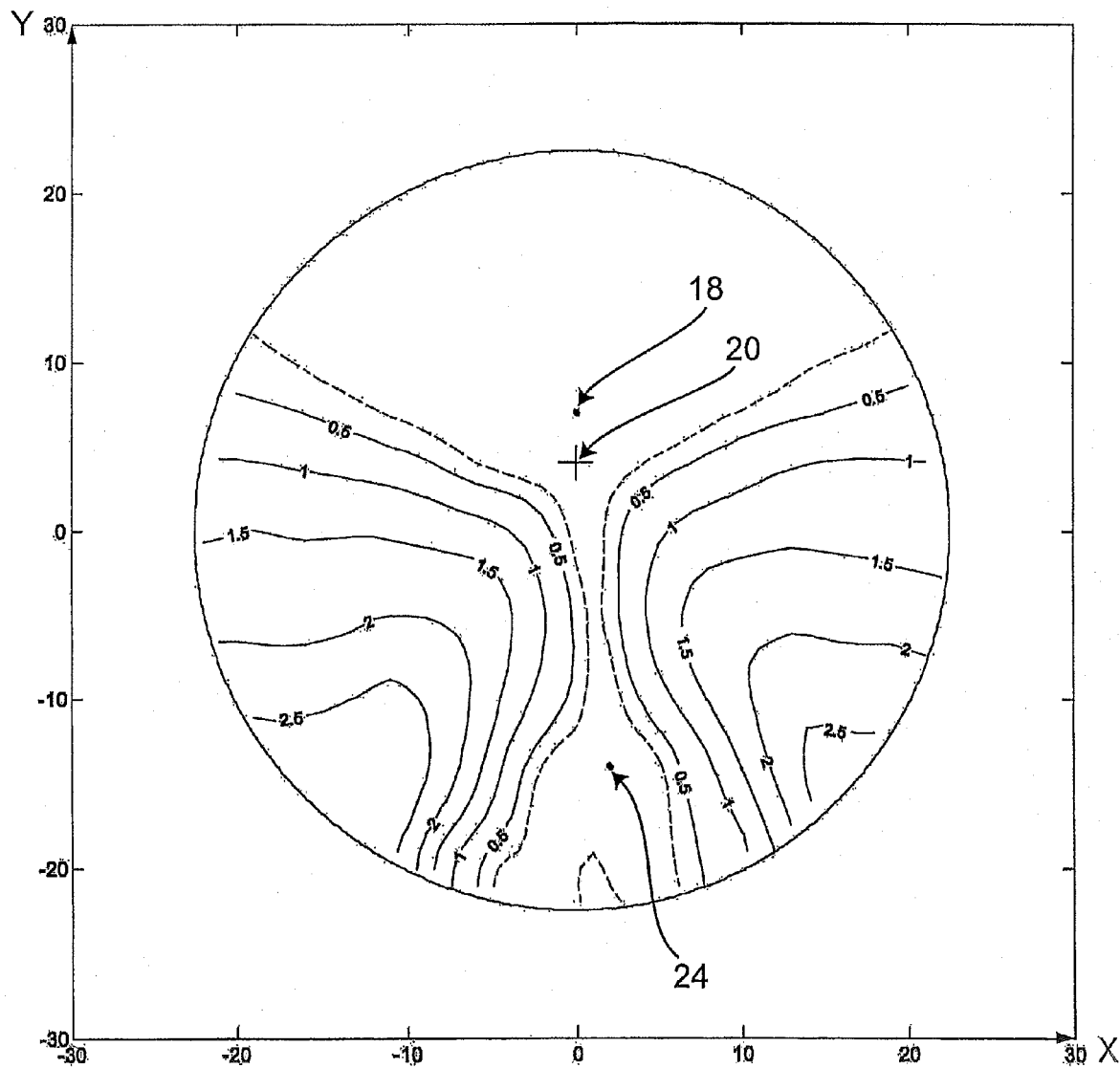
FIG. 6 shows the distribution of astigmatic aberrations over the entire lens element in FIG. 4.

FIG. 6 shows a distribution of the astigmatic aberration, or of the absolute astigmatic differences of the astigmatic power components of the focusing actions of the lens element 10, which is also shown in FIG. 4. A change in the image quality between the lens elements illustrated in FIGS. 3 and 4 is only very slight.

Figure 7:
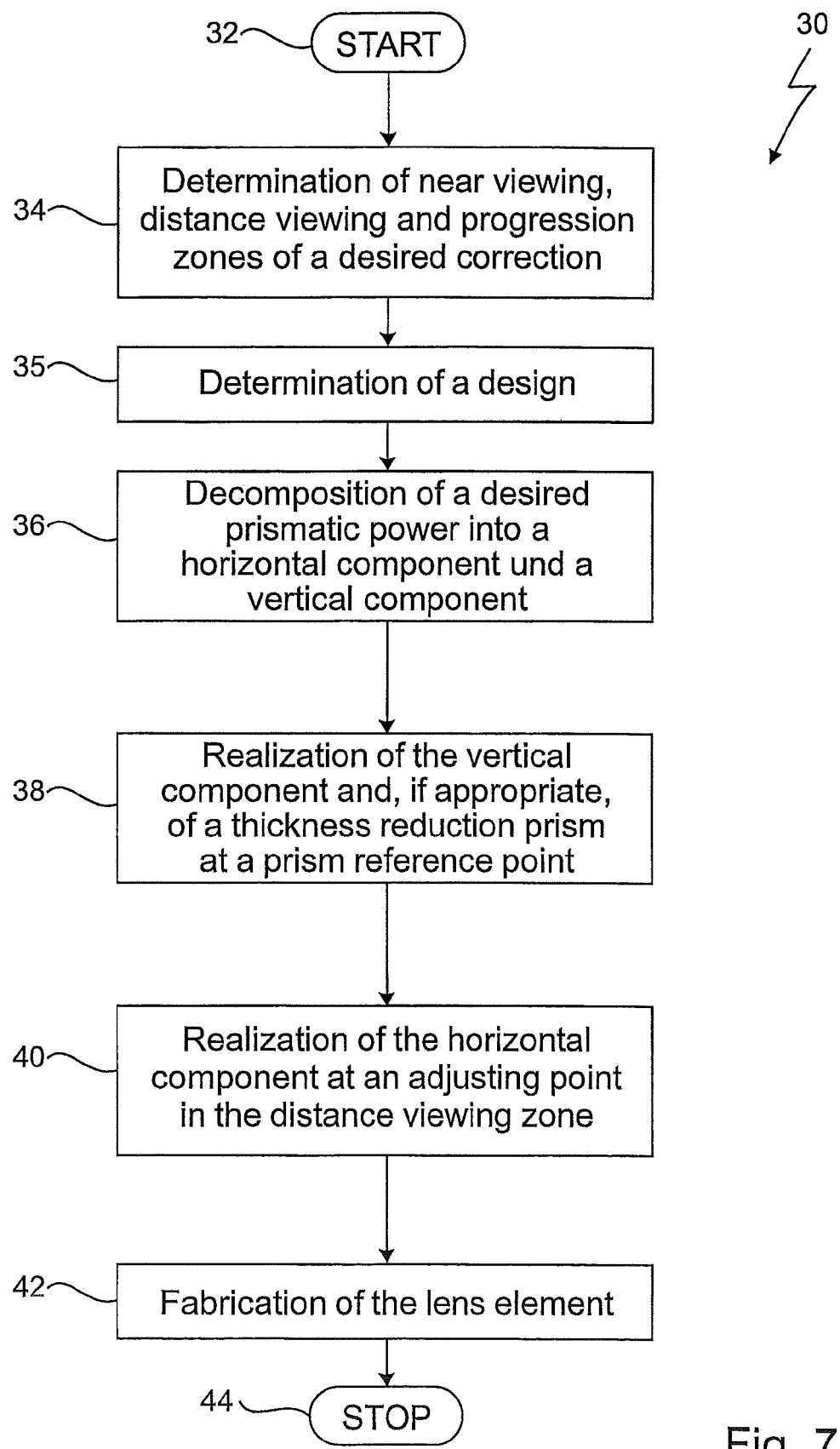
FIG. 7 shows a diagrammatic flowchart of a method in accordance with a further embodiment of the invention.

FIG. 7 shows an embodiment of a method 30. The method begins in a start step 32.

Firstly, the near viewing, the distance viewing and the progression zones 12, 14, 16 and the position of the reference or design points are determined for progressive spectacles when designing a lens element 10 in a step 34.

The design of the lens element 10 is then determined in a step 35. Proceeding from the dioptric power requirement, specified by the ophthalmologist, for the lens element 10, a specific progressive surface for the lens element 10 is determined in the case of standard progressive lenses, and a target distribution of the spherical and astigmatic aberrations is determined in the case of individually optimized progressive lenses (the "design" of the lens element). "Design" is understood in this case as the determination of the distribution of the astigmatic and spherical aberrations. In the case of standard progressive lenses, there have already been optimized in a preprocess a range of progressive surfaces from which a suitable surface is selected from the current prescription of the ophthalmologist. In the case of individually optimized progressive lenses, there have already been produced in a preprocess a range of target designs from which a desired design is selected for the current prescription of the ophthalmologist. The realization of the "design" can be performed by an "individual optimization", this being understood as the attainment of the desired distribution of the spherical and astigmatic errors for the dioptric power requirement prescribed by the ophthalmologist under consideration of the individual use conditions. Use conditions are, for example, the pantoscopic angle, the frame wrap angle, the pupil distance, the corneal vertex distance (the distance of the back surface of the lens element from the cornea), the frame dimensions and object distances in distance and proximity. In a further step, it is also possible to determine a sag of the front surface of the lens element 10.

In the case of standard progressive lenses the design is already substantially defined by the selection of the progressive surface, that is to say a selection of the progressive surface takes place in step 35. If the target design is determined in the case of individual progressive lenses, an optimization of the progressive surface of the lens takes place such that the distribution of the aberrations which is desired in accordance with the target design is virtually achieved taking account of the specific dioptric prescription and of the specific use conditions for the spectacle wearer. Before this optimization, the division of the prismatic power over two different points must already have been performed in order to take suitable account of the prismatic requirements when optimizing. In the case of standard progressive lenses, by contrast, the aberrations can be enlarged as a function of the specific use conditions and the specific dioptric prescription because of the unchanged progressive surface.

In a step 36, a prismatic power prescribed by the ophthalmologist is then decomposed into a horizontal component and a vertical component. After decomposition of the prismatic requirements into horizontal and vertical components, the prismatic requirement is realized in a step 38 by a suitable tilting of a front surface in relation to a back surface of the lens element 10. Moreover, in the case of individually optimized progressive lenses or lens elements 10, the (changed) prismatic requirement is also taken into account in the individual optimization of the progressive surface, in order to achieve the desired target distribution of the spherical and astigmatic aberrations independently of the prismatic requirements.

When designing the lens element 10, in a step 38 the vertical component and, if appropriate, a thickness reduction prism are realized at a determined prism reference point 22 in order to reduce the thickness of the lens element 10 produced.

In a step 40, the horizontal component of the prescribed prismatic power is realized at an adjusting point 20 in the distance viewing zone 12. The horizontal component and the vertical component of the prescribed prismatic power are therefore realized at different points.

The way in which steps 38 and 40 proceed is not subject to any mandatory sequence. Steps 38 and 40 can take place sequentially, and it is also possible in this case as an alternative to execute step 40 before step 38. In general, the realizations of the horizontal and vertical powers take place, however, at the same time and/or in an interlaced fashion. Steps 38 and 40 can therefore be executed simultaneously. In particular, in the case of the individual optimization of a spectacle lens a mutual dependence of all the parameters which involve optimization is present in the optimization result, and so there can be a need to implement the prismatic requirements simultaneously and/or in an interlocked fashion.

After step 40, the design phase of the lens element 10 is concluded, and the lens element 10 is fabricated in accordance with the design data in a step 42.

The method 30 then ends in a stop step 44. A lens element in accordance with an embodiment such as has been described above has now been produced. The next lens element 10 can subsequently be produced.

Basic features of the method 30 are the same for all lens elements 10. Differences can arise from whether standard progressive lenses or individually optimized progressive lenses are to be produced. In the case of standard progressive lenses, there have already been optimized in a preprocess a range of progressive surfaces from which a suitable surface is selected in accordance with the current prescription of the ophthalmologist. In the case of individually optimized progressive lenses, there have been produced in a preprocess a range of target designs from which a desired design for the current prescription of the ophthalmologist is selected.

The following method sequence can therefore be provided for standard progressive lens elements:
1) Determination of the distance, progression and near viewing zones.
2) Selection of a progressive surface in accordance with 1) and in accordance with a possibly predetermined sag of the lens.
3) Decomposition of the desired prismatic power into a horizontal component and a vertical component.
4) Realizing of the vertical component and, if appropriate, of the thickness reduction prism at a prism reference point, and of the horizontal component at a point in the distance viewing zone by suitably tilting front and back surfaces in relation to one another simultaneously determining the geometry of the prescription surface which is required by the dioptric prescription.
5) Fabrication of the lens element.

In the case of individually optimized progressive lens elements, the following method sequence can be provided:
1) Determination of the distance, progression and near viewing zones.
2) Selection of the target design in accordance with 1) and determination of the sag of the lens.
3) Decomposition of the desired prismatic power into a horizontal component and a vertical component.
4) Realizing of the vertical component and, if appropriate, of the thickness reduction prism at a prism reference point, and of the horizontal component at a point in the distance viewing zone by optimization (with the inclusion of the specific use conditions and of the dioptric prescription) of the progressive surface with regard to the target design and by suitable tilting of front and back surfaces relative to one another.
5) Fabrication of the lens element.

What is claimed is:

1. A lens element for progressive spectacles, having at least one near viewing zone and a distance viewing zone which have different focusing powers, said lens element having a total prismatic power, said total prismatic power comprising a vertical component and a horizontal component, wherein said vertical component of said total prismatic power is realized at a first point of said lens element, and said horizontal component of said total prismatic power is realized at a second point of said lens element, and wherein said second point is different from said first point.

2. The lens element according to claim 1, wherein said second point is a point in said distance viewing zone.

3. The lens element according to claim 1, wherein neither said first point nor said second point is in said near viewing zone.

4. The lens element according to claim 1, wherein a thickness reduction prism is realized at said first point.

5. A lens element for progressive spectacles, having at least one near viewing zone and a distance viewing zone which have different focusing powers, said lens element having a predetermined prismatic power, said predetermined prismatic power comprising a vertical component and a horizontal component, wherein said vertical component of said predetermined prismatic power is realized at a first point of said lens element, and said horizontal component of said predetermined prismatic power is realized at a second point of said lens element, wherein said distance viewing zone and said near viewing zone merge continuously into one another in a progression zone, said first point being at a location of said progression zone at which at least 20% of an addition of said lens element is achieved.

6. A lens element for progressive spectacles, having at least one near viewing zone and a distance viewing zone which have different focusing powers, said lens element having a predetermined prismatic power, said predetermined prismatic power comprising a vertical component and a horizontal component, wherein said vertical component of said predetermined prismatic power is realized at a first point of said lens element, and said horizontal component of said predetermined prismatic power is realized at a second point of said lens element, wherein said lens element has a cylindrical power (cyl) of greater than 0.5 dioptres given an axis direction A for which it holds that: $10°<A<80°$ or $100°<A<170°$.

7. A method for producing a lens element having at least one near viewing zone and a distance viewing zone which have different focusing powers, and a total prismatic power, said total prismatic power comprising a vertical component and a horizontal component, wherein said total prismatic power is decomposed into said vertical component and said horizontal component, and wherein said vertical component of said total prismatic power is realized at a first point of said lens element, and said horizontal component of said total prismatic power is realized at a second point of said lens element, and wherein said second point is different from said first point.

8. The method according to claim 7, wherein said second point is a point in said distance viewing zone.

9. The method according to claim 7, wherein neither said first point nor said second point is in said near viewing zone.

10. The method according to claim 7, wherein a thickness reduction prism is realized at said first point.

11. A method for producing a lens element having at least one near viewing zone and a distance viewing zone which have different focusing powers, and a predetermined prismatic power, wherein a vertical component of said predetermined prismatic power is realized at a first point of said lens element, and a horizontal component of said predetermined prismatic power is realized at a second point of said lens element, wherein said distance viewing zone and said near viewing zone are configured in such a way that they merge continuously into one another in a progression zone, said first point being at a location of said progression zone at which at least 20% of an addition of said lens element is achieved.

12. A method for producing a lens element having at east one near viewing zone and a distance viewing zone which have different focusing powers, and a predetermined prismatic power, wherein a vertical component of said predetermined prismatic power is realized at a first point of said lens element, and a horizontal component of said predetermined prismatic power is realized at a second point of said lens element, wherein said lens element is produced with a cylindrical power (cyl) of greater than 0.5 dioptres given an axis direction A for which it holds that: $10° < A < 80°$ or $100° < A < 170°$.

13. A lens element for progressive spectacles, produced by a method for producing a lens element having at least one near viewing zone and a distance viewing zone which have different focusing powers, and a total prismatic power, said total prismatic power comprising a vertical component and a horizontal component, wherein said total prismatic power is decomposed into said vertical component and said horizontal component, and wherein a vertical component of said total prismatic power is realized at a first point of said lens element, and a horizontal component of said total prismatic power is realized at a second point of said lens element, and wherein said second point is different from said first point.

14. A lens element for use in progressive spectacles in order to reduce a non-prescribed prismatic power of said progressive spectacles for a spectacle wearer, said lens element having at least one near viewing zone and a distance viewing zone which have different focusing powers, said lens element having a total prismatic power, said total prismatic power comprising a vertical component and a horizontal component, wherein said vertical component of said total prismatic power is realized at a first point of said lens element, and said horizontal component of said total prismatic power is realized at a second point of said lens element, and wherein said second point is different from said first point.

15. A method for reducing a non-prescribed prismatic power for a spectacle wearer, said method comprising the step of using a lens element to produce progressive spectacles for said spectacle wearer, said lens element having at least one near viewing zone and a distance viewing zone which have different focusing powers, said lens element having a total prismatic power, said total prismatic power comprising a vertical component and a horizontal component, wherein said total prismatic power is decomposed into said vertical component and said horizontal component, and wherein said vertical component of said total prismatic power is realized at a first point of said lens element, and said horizontal component of said total prismatic power is realized at a second point of said lens element, and wherein said second point is different from said first point.

* * * * *